(12) United States Patent
Renforth et al.

(10) Patent No.: US 6,318,300 B1
(45) Date of Patent: Nov. 20, 2001

(54) PET TOY

(75) Inventors: Jack Renforth, Aurora; Carol Woodruff, Denver, both of CO (US)

(73) Assignee: Aspen Pet Products, Inc., Denver, CO (US)

( * ) Notice: Subject to any disclaimer, the term of this patent is extended or adjusted under 35 U.S.C. 154(b) by 0 days.

(21) Appl. No.: 09/285,605

(22) Filed: Apr. 2, 1999

(51) Int. Cl.$^7$ .......................... A01K 29/00; A01K 15/02
(52) U.S. Cl. .......................... 119/708; 119/707; 119/702
(58) Field of Search .................................. 119/702, 707, 119/708, 706, 701

(56) References Cited

U.S. PATENT DOCUMENTS

| | | | | |
|---|---|---|---|---|
| 3,312,195 | * | 4/1967 | Rohena | 119/701 |
| 4,712,510 | * | 12/1987 | Tae-Ho | 119/708 |
| 5,111,771 | * | 5/1992 | Mathews | 119/708 |
| 5,148,769 | | 9/1992 | Zelinger | 119/29 |
| 5,474,032 | | 12/1995 | Krietzman et al. | 119/708 |
| 5,505,161 | | 4/1996 | Swendseid | 119/708 |
| 5,829,391 | | 11/1998 | Krietzman et al. | 119/708 |
| 5,924,387 | * | 7/1999 | Schramer | 119/708 |
| 6,016,771 | * | 1/2000 | Baiera et al. | 119/708 |
| 6,058,887 | * | 5/2000 | Silverman | 119/609 |

* cited by examiner

Primary Examiner—Charles T. Jordan
Assistant Examiner—Judith A. Nelson
(74) Attorney, Agent, or Firm—Wolf, Greenfield & Sacks, P.C.

(57) ABSTRACT

A pet toy includes a mount, a support, and an object. In one embodiment, a first end of the support is pivotally connected to the mount so that a second end of the support is permitted pivot about the mount, and the object, which is intended to entice a pet, is supported by a second end of the support. In another embodiment, the mount is adapted to contact as few as two external surfaces of a structure to which the mount is to be attached, a first end of the support is supported by the mount, and the object, which is intended to entice a pet, is supported by a second end of the support.

25 Claims, 6 Drawing Sheets

PET TOY

BACKGROUND OF THE INVENTION

1. Field of the Invention

The present invention is directed to the field of pet supplies and, more particularly, to implements for entertaining pets.

2. Discussion of Related Art

Many people enjoy watching their pets play, and therefore create toys or other implements to encourage them to do so. Also, when pets are left alone, i.e., without human company, they can become bored and/or agitated. Therefore, when left alone for long periods of time, pets can become mischievous and damage property in the area in which they are confined. For example, if a cat is left alone in a person's home, the cat may urinate or defecate in an improper place, or may claw or scratch furniture, drapes, etc., out of boredom and/or spite for being left alone. In addition, even if a particular pet does not engage in such deviant behavior, often the pet's owner will feel guilty each time he or she leaves the pet alone. For these reasons, many pet owners find it desirable to provide toys or other implements to keep their pets entertained and/or distracted for as long as possible when left alone.

It is known that cats can be kept amused by objects that swing through the air. This may be true, for example, because such objects resemble flying creatures (e.g., birds, bats, insects, etc.), and the cats think or pretend that they are playing with or attacking such creatures. For this purpose, several prior art "cat toy" devices employ elongated, elastic beams having objects (which are intended to entice cats) dangled from their distal ends by pieces of string or chain. Some of these devices use beams having proximal ends that are adapted to be hand-held by cat owners so that the owners can dangle and selectively move the objects in front of their cats to keep them entertained. Other such prior art devices are adapted to be secured to the tops of doors or doorways using snap-on clips. Necessarily, the devices mounted on the tops of doors employ relatively long (e.g., six foot) strings to dangle the objects so that they can be reached by cats on the ground. It is known to use elastic strings for the devices mounted to the tops of doorways so as to increase the dynamic action of the dangled object.

While these door-mounted cat toys can be manipulated by cats without requiring any intervention by the cats' owners, thereby permitting the devices to keep cats entertained while their owners are away, Applicants have recognized that it is not always desirable to mount these types of pet toys only on doors. Generally, doors are located only where entry to or exit from a residence, room, closet, or the like, is required. Pet owners may find it annoying to have to negotiate around dangling strings and objects each time they use doors to which such devices are attached. Additionally, pet owners may simply want to install such devices at places other than where doors are located. For example, an owner may enjoy watching his or her pet play with such a toy, and a door may not be located at a place that is convenient or comfortable for the owner to do so.

Additionally, Applicants have recognized that, although these types of door-mounted cat toys can be quite effective in keeping cats entertained for short periods of time, a cat may tend to lose interest in such a toy after an extended period of use because the dangling object always returns to the same position when it stops moving. That is, with such a door-mounted cat toy, when a cat swats the dangling object with a paw or otherwise causes the object to move through the air, the elasticity of the beam permits the beam to flex, and the beam oscillates back and forth before finally coming to rest in its initial position. This oscillating of the beam can cause the object to move about rapidly, thereby enticing the cat to hit it again. However, because the beams of such devices always return to the same position after having been caused to flex, the objects dangled therefrom also always return to the same position in front of the door. Applicants have recognized that, for this reason, cats eventually tend to lose interest in playing with the dangling objects. Applicants hypothesize that this is true because the dangled objects of such devices do not mimic the behavior of real creatures insofar as real creatures would not tend to return to the same location each time they stop moving. Rather, a real creature is more likely to come to rest at a different location each time it stops moving.

What is needed, therefore, is an improved pet toy.

SUMMARY OF THE INVENTION

According to one aspect of the present invention, a pet toy includes a mount, a support, and one or more objects. The support has first and second ends, with the first end being pivotally connected to the mount so that the second end, which supports the object(s), is permitted pivot about the mount.

According to another aspect of the present invention a pet toy includes a mount, an elongated, elastic support, and one or more objects. The mount is adapted to contact as few as two external surfaces of a structure to which the mount is to be attached. The support, which is straight when it is not flexed, has first and second ends, with the first end being supported by the mount, and with the object(s) being supported by the second end.

DETAILED DESCRIPTION OF THE INVENTION

Figure 1:
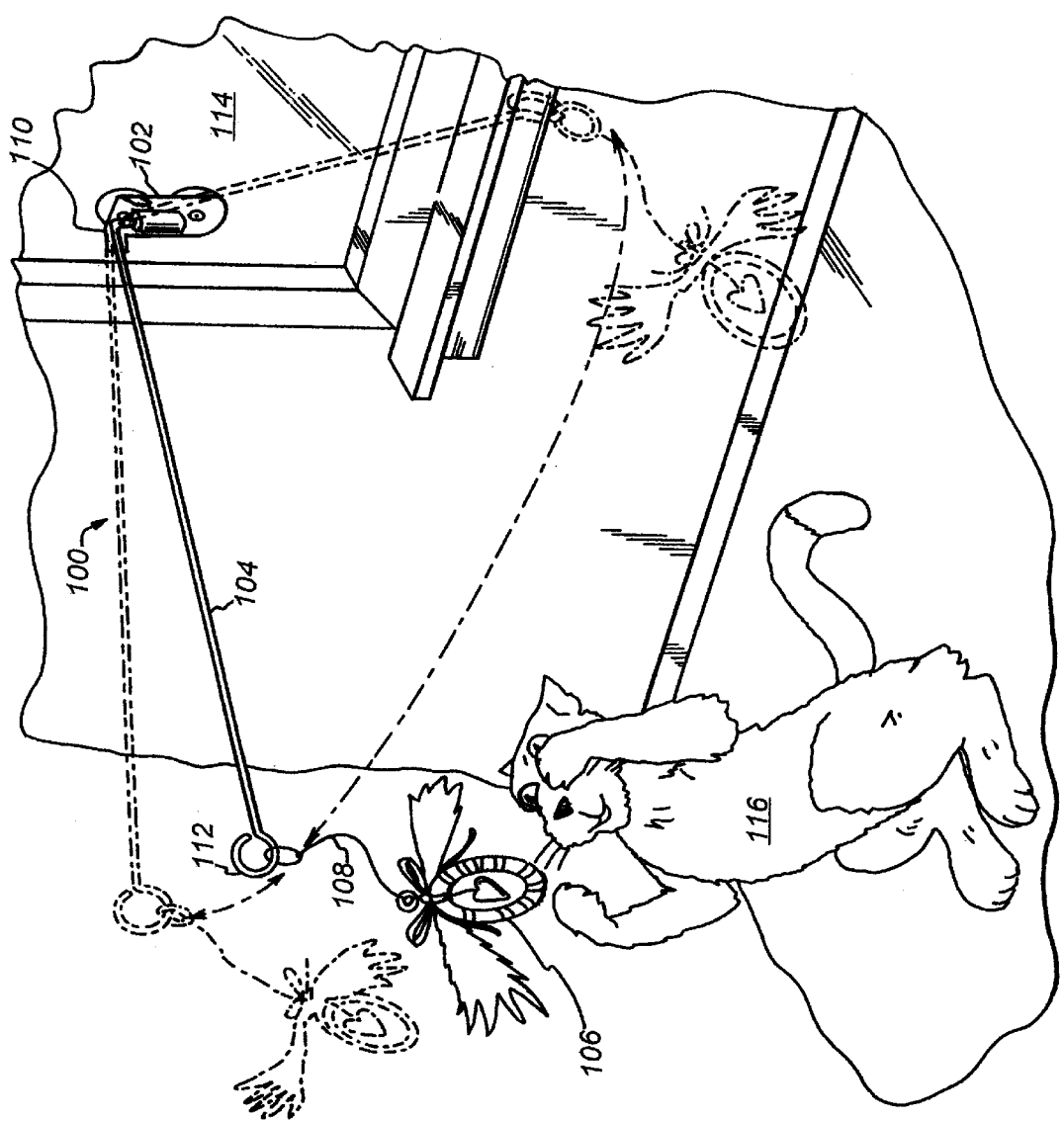
FIG. 1 shows an illustrative embodiment of a pet toy configured in accordance with the present invention.

As mentioned above, prior art pet toys that employ elastic beams adapted to be mounted to the tops or bottoms of doors suffer from the disadvantage that pet owners can install such devices only where doors are located. According to one aspect of the present invention, this disadvantage is overcome by employing a mount (which supports a support having an object dangled therefrom) that is adapted to be mounted to any external surface of a structure, e.g., a wall, window, table top, table leg, or the like, and is not required to be, but may be, mounted to a door.

Additionally, as also mentioned above, such prior art door-mounted pet toys suffer from the disadvantage that the distal ends of their elastic supports, and the objects dangled therefrom, always return to the same location after the supports cease bouncing. According to another aspect of the present invention, this disadvantage is overcome by pivotally connecting a proximal end of a support (which has an object dangled from its distal end) to a mount so that the distal end of the support is permitted to pivot about the mount. With embodiments of the invention incorporating this aspect, each time a pet causes the dangling object to move, e.g., by swatting at it with a paw, the support can pivot so that the distal end of the support can come to rest at any location within the support's allowed pivoting range. Therefore, with such embodiments, the dangling object also can come to rest at a different location after each time it is swatted by the pet, and the pet is more likely to remain interested in the object because the object behaves more like that of an actual creature.

FIGS. 1–6 show an illustrative embodiment of a pet toy 100 which incorporates the above-described aspects of the present invention. In the illustrative embodiment shown, a proximal end 110 of an elongated support 104 is pivotally connected to a mount 102, and an object 106 is dangled (by a tether 108) from a distal end 112 of the support 104. In the embodiment shown, both the support 104 and the tether 108 are elastic (i.e., both flexible and resilient). Therefore, when a cat 116 swats at the object 106, the support 104 can flex and then return to its original shape (see FIG. 2), and the tether 108 can stretch and then return to its original length. In this manner, the object 106 can bounce randomly as a result of the combined forces generated by these two elastic elements. It should be appreciated, however, that the invention is not limited in this respect, and that a non-elastic support and/or a non-elastic tether or chain may alternatively be employed.

Figure 2:
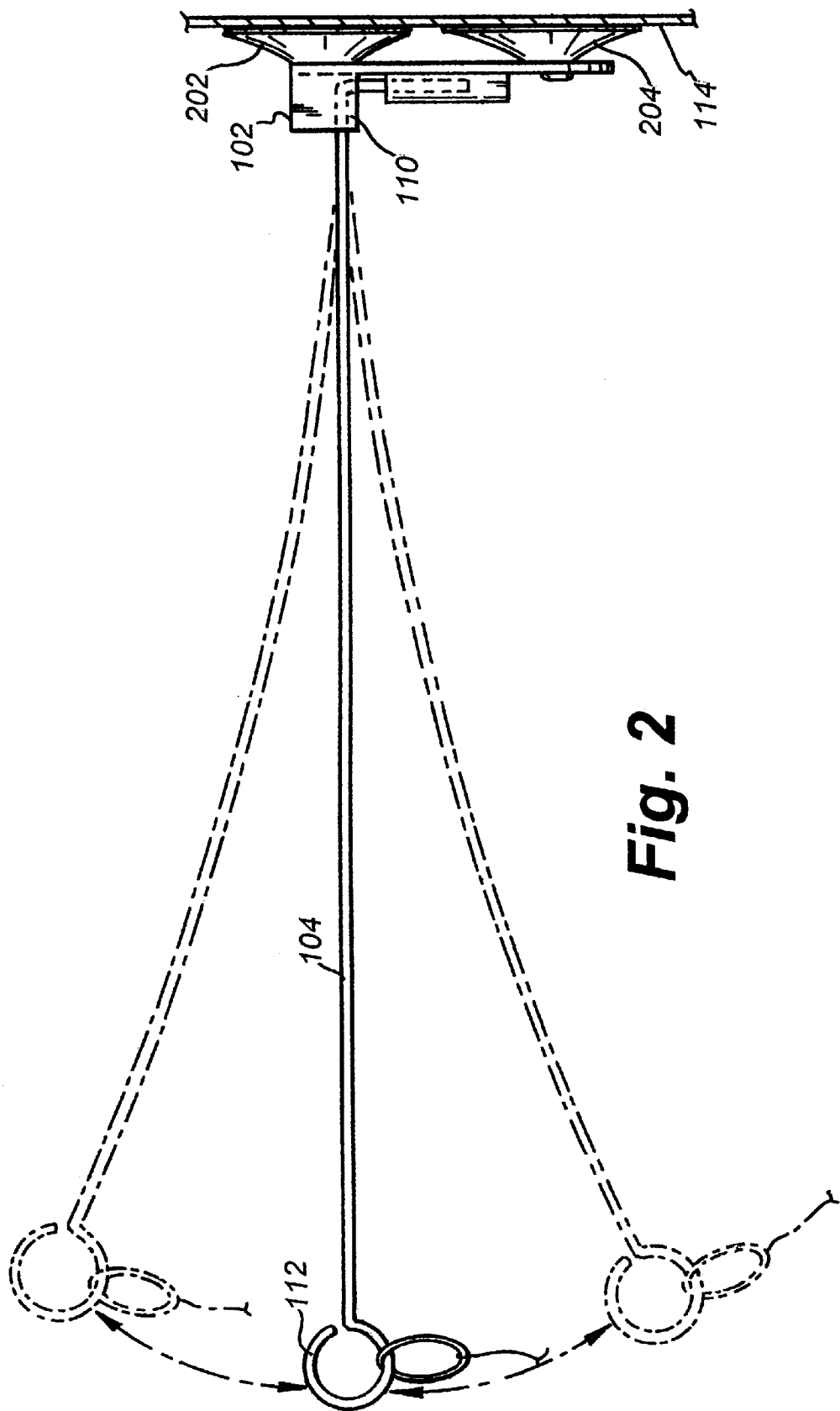
FIG. 2 is a side view of the pet toy of FIG. 1 in which the bouncing action of the toy's support is illustrated.
Figure 3:
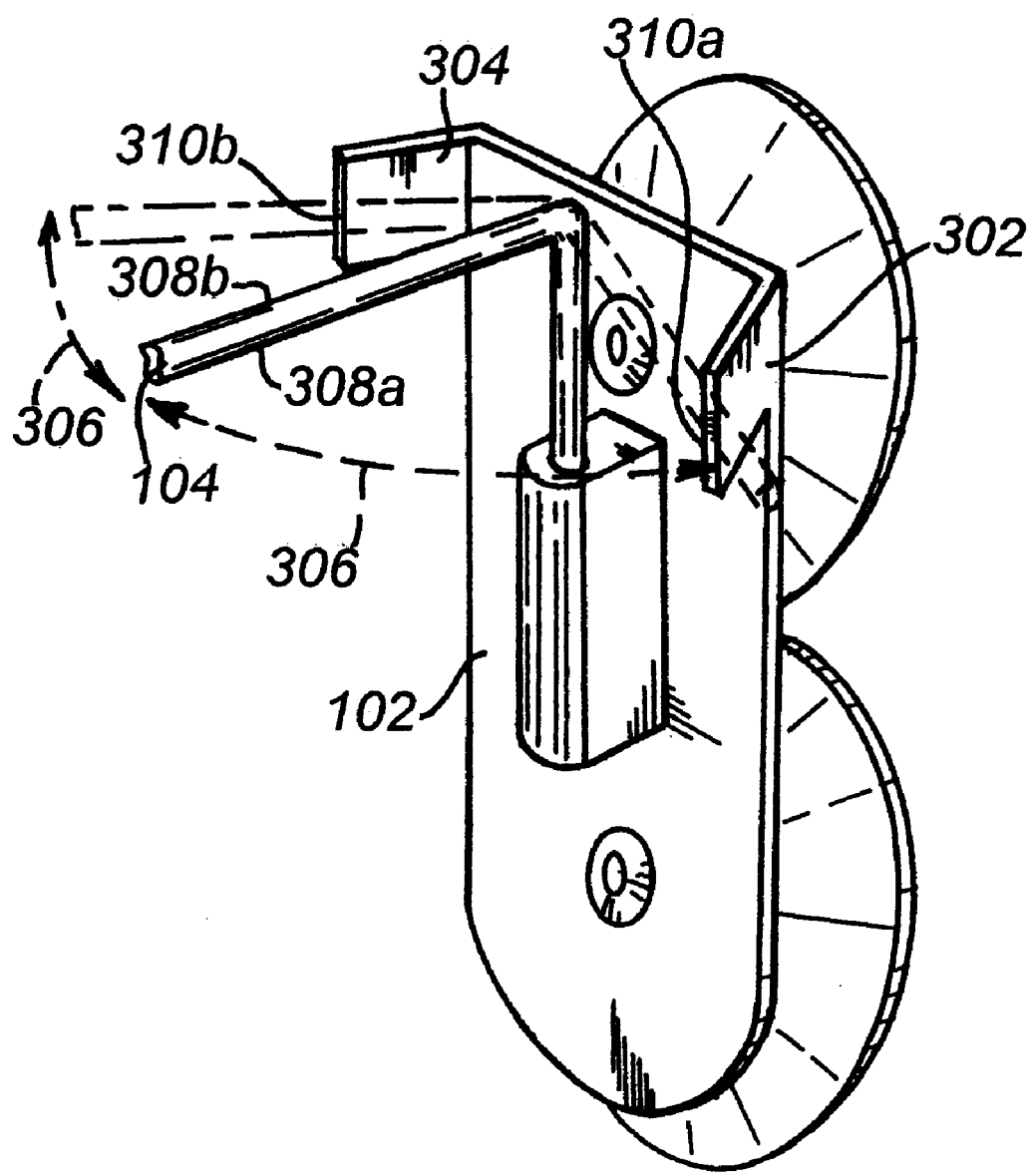
FIG. 3 is a perspective view of the cat toy of FIGS. 1–2 in which the pivoting action of the toy's support is illustrated.

FIGS. 1–3 illustrate the various ranges of motion of the support 104 in accordance with one embodiment of the invention. As shown in FIGS. 1–3, when the cat 116 (FIG. 1) or other animal swats or otherwise causes the object 106 to move, the support 104 can be caused to flex (see FIG. 2) and/or can be caused to pivot with respect to the mount 102 (see FIG. 3).

When the support 104 is caused to flex (FIG. 2) in response to force being exerted on the object 106, its distal end 112 is caused to bounce with respect to the mount 102. To achieve this bouncing action of the distal end 112, the support 104 may be configured in any of numerous ways and may be made of any of numerous materials, and the invention is not limited to any particular configuration or material. In the illustrative embodiment of FIGS. 1–3, for example, the entire support 104 is made of steel wire so that it will flex and return to its original shape in response to the amount of force that would typically be exerted by a domestic animal such as a cat. Alternatively, the support 104 may, for example, be made of stainless steel wire or spring wire. In some embodiments, only one or more portions of the support 104 (e.g., only the proximal end 110) may be made of an elastic material, with the remainder of the support 104 being non-elastic, to achieve a similar result. In another alternative embodiment, a spring-loaded hinge (not shown) or simply a spring (not shown) may be located at the proximal end 110 so that the distal end 112 can bounce as shown in FIG. 2. FIG. 2 illustrates (in phantom) how the support 104 may be flexed in accordance with one embodiment of the invention, with the resting position of the support 104 being shown using solid lines in FIG. 2. It should be appreciated, however, that the support 104 may flex more or less than shown (in phantom) in FIG. 2, and that the invention is not limited a support that flexes to any particular minimum or maximum position. Again, while embodiments in which the distal end 112 bounces (e.g., as shown it FIG. 2) can provide significant advantages, it should be appreciated that the invention is not limited in this respect, and all embodiments of the invention need not incorporate this feature.

FIG. 3 illustrates how the support 104 can pivot with respect to the mount 102 in accordance with one embodiment of the invention. In the embodiment shown, the mount 102 includes a pair of arms 302 and 304 that are positioned so as to limit the pivoting range of the support 104. In FIG. 3, the outermost limits of the pivoting range of the support 104 are shown in phantom, and the pivoting motion of the support 104 is illustrated by arrows 306. As shown, the pivoting of the support 104 is limited when sides 308a and 308b of the support 104 contact ends 310a and 310b of the arms 302 and 304, respectively.

Figure 4:
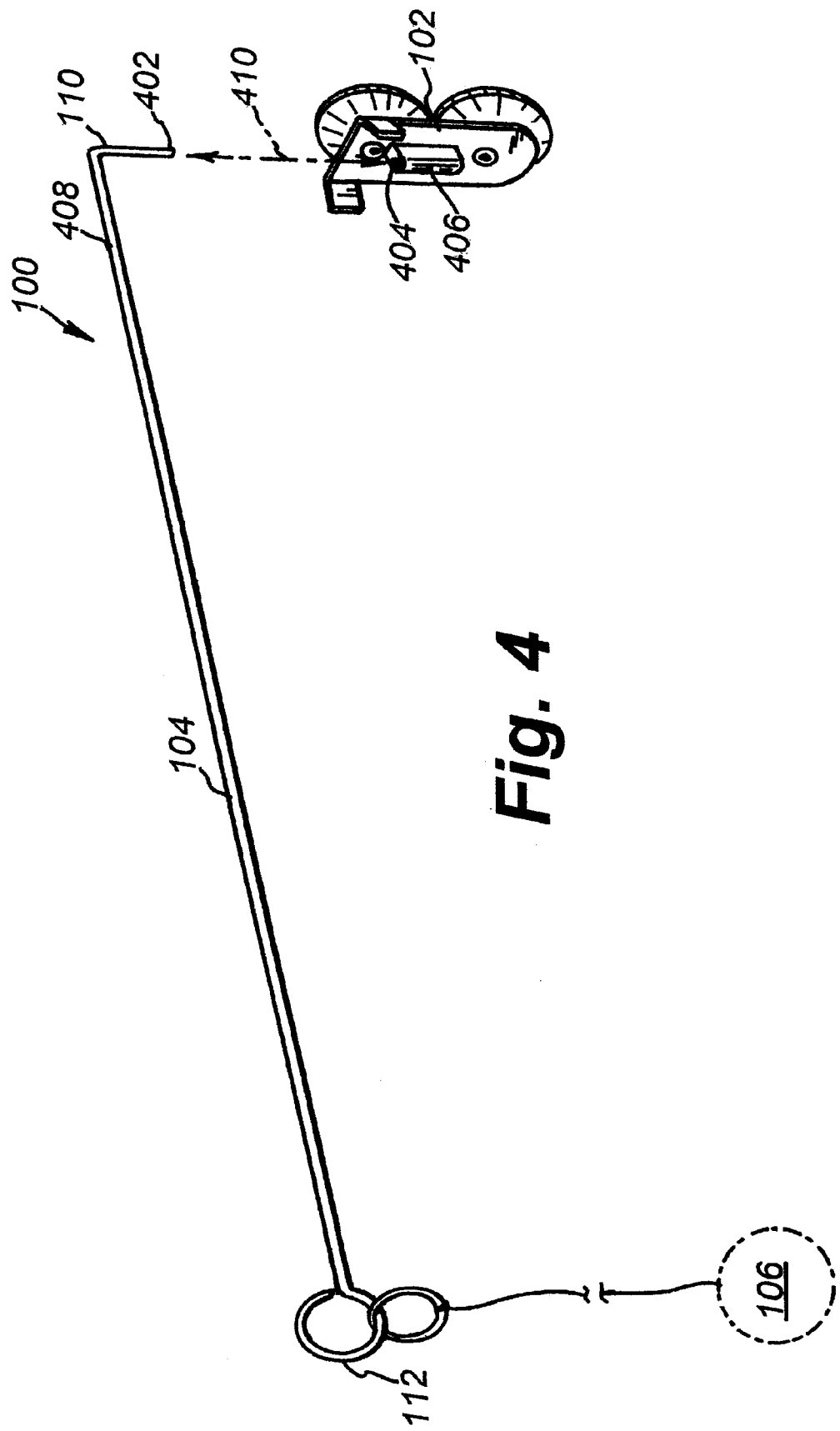
FIG. 4 is a perspective, exploded view of the pet toy of FIGS. 1–3.

The support 104 may be pivotally connected to the mount 102 in a number of alternative ways, and that the invention is not limited to any particular type of connection. FIG. 4 illustrates one illustrative example of how this pivotal connection may be established. In the embodiment shown, the proximal end 110 of the support 104 includes an end 402 that is bent at a right angle with respect to an elongated section 408 of the support 104. As illustrated by the arrow 410, the end 402 may be inserted into a corresponding hole 404 formed within a projecting portion 406 of the mount 102. In this manner, so long as the diameter of the hole 404 is at least slightly larger than the diameter of the end 402, the end 402 will be permitted to pivot within the hole 404. Again, it should be appreciated that the manner of making the pivotal connection between the proximal end 110 and the mount 102 is not critical, and that any other technique may alternatively be used to establish such a connection.

Figure 5:
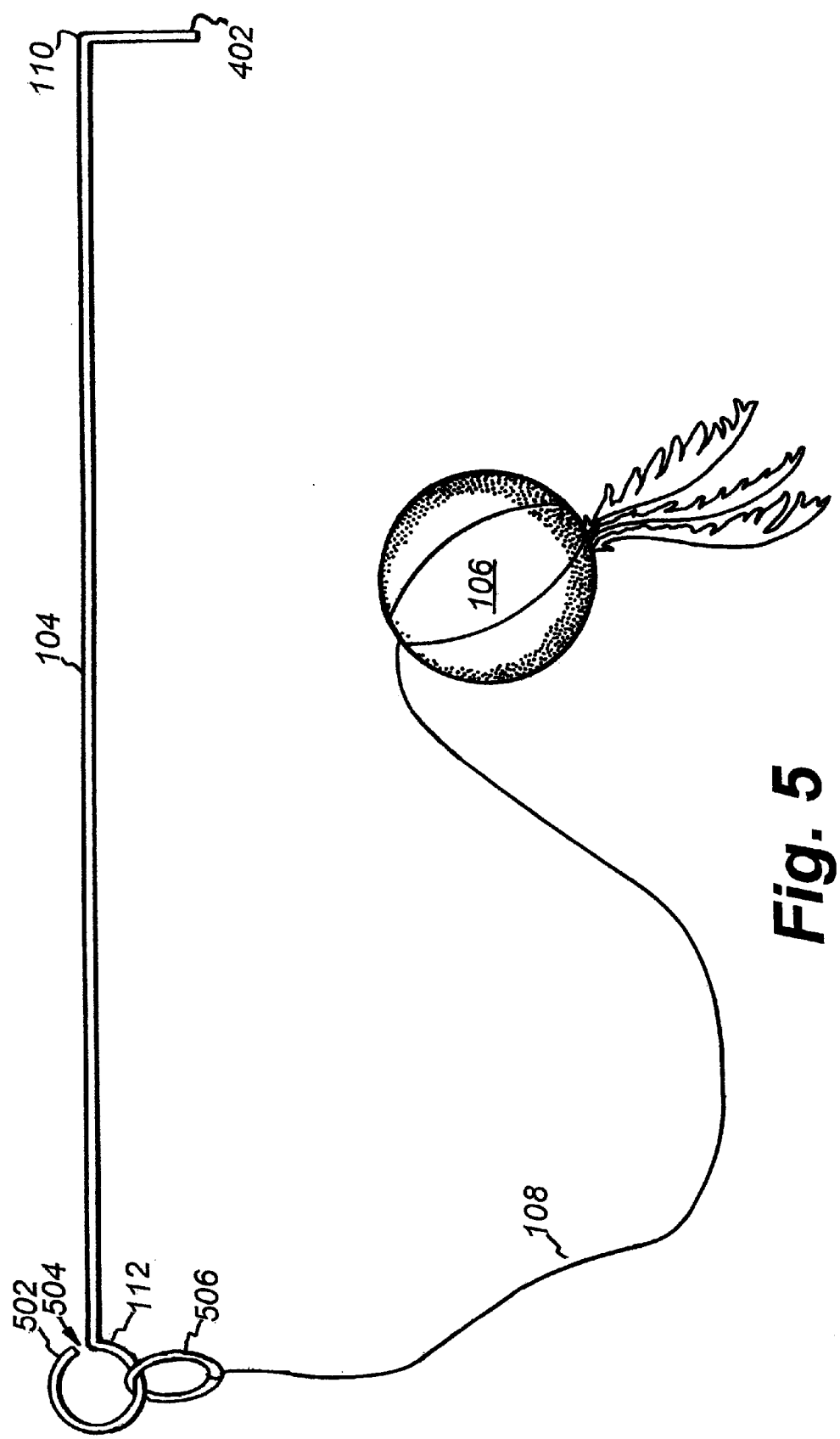
FIG. 5 shows the support of the pet toy of FIGS. 1–4 and an object attached to a distal end thereof according to one embodiment of the invention.
Figure 6A:
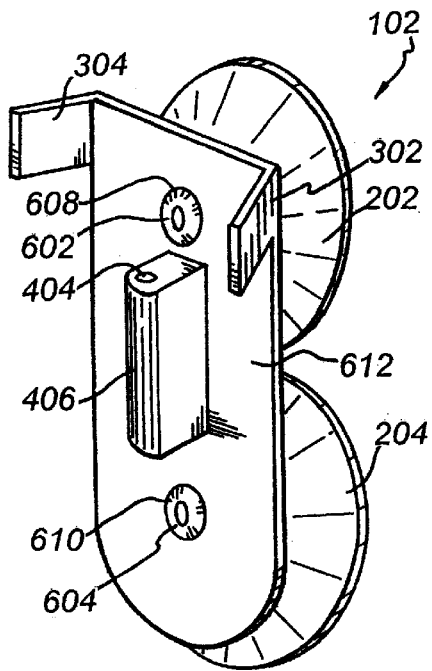
FIGS. 6A–D shows several views of the mount of the pet toy of FIGS. 1–5.
Figure 6B:
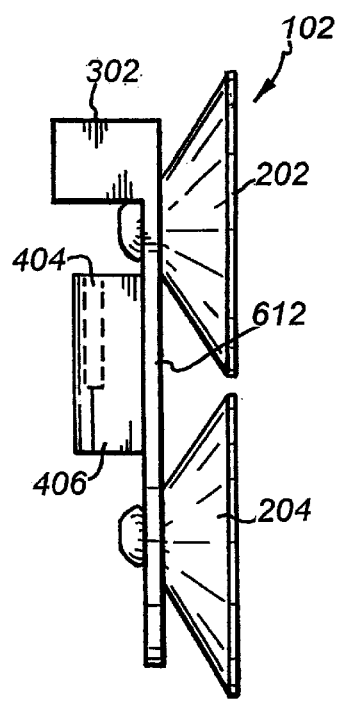
Figure 6C:
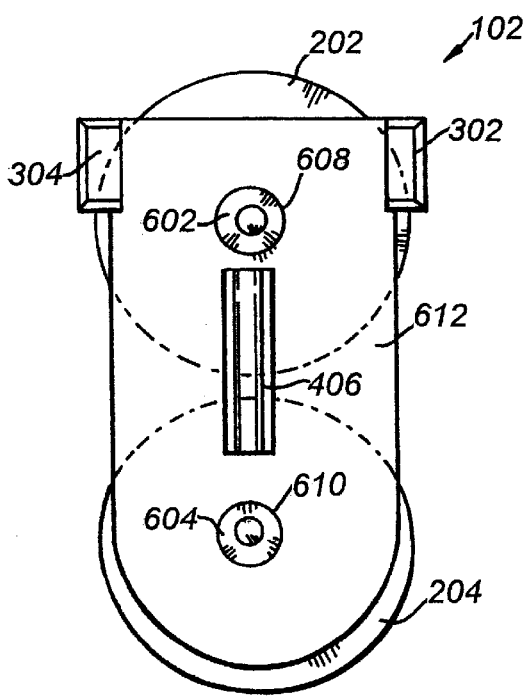
Figure 6D:
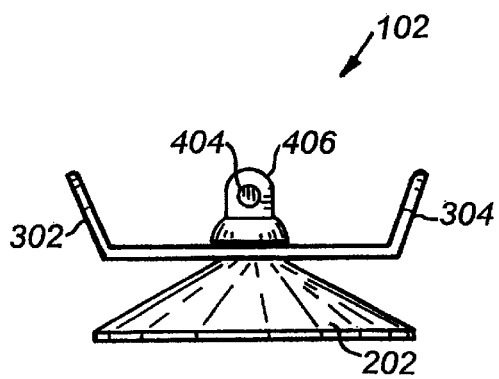

The object 106 which is supported by the distal end 112 of the support 104 may take on any numerous forms, and the invention is not limited to any particular type of object. Ideally, the object 106 is selected so as to be enticing to the animal that will be using the toy. In embodiment for use with cats, for example, objects 106 that look like birds or objects 106 that contain catnip may be serve this purpose well. Examples of two objects that may be used are illustrated in FIGS. 1 and 5. While a single object is dangled from the distal end 112 of the support 104 in each of these examples, it should be appreciated that the invention is not limited in this respect, and that two or more objects may be used in alternative embodiments.

In whatever form it takes, the object 106 may be supported by the distal end 112 of the support 104 in any of the number of ways, and the invention is not limited to any particular securing technique. In the illustrative embodiment shown, the object 106 is supported by the distal end 112 using a tether 108 connected to a ring 506. As shown, the distal end 112 of the support 104 may also includes a ring portion 502. The ring 502 may either be integral with the support 104 (as shown in FIG. 5), or may be a separate component attached to the distal end 112 of the support 104. In the example shown, the ring 506 may be inserted into a gap 504 in the ring 502 so that the rings 502 and 506 can be interlocked with one another. In this manner, any of several different objects 106, each having a respective tether 108 and ring 506 attached thereto, may be selected and attached to the distal end 112 of the support 104 via the gap 504. It should be appreciated that the invention is not limited in this respect, however, and that other devices and/or techniques may be used to removably secure the object 106 to the distal end 112 of the support 104. In some embodiments, for example, the ring 506 may have a gap formed therein which permits the rings 502 and 506 to be interlocked. In other embodiments, the object 106 and/or the tether 108 may be permanently secured to the distal end 112. In this regard it should also be understood that some embodiments may simply not employ the tether 108. Instead, the object 106 may, for example, be attached directly to the distal end 112 of the support 104.

When used, the tether 108 may be made of any of numerous materials, and the invention is not limited to any particular type of tether. As discussed above, in one embodiment of the invention, the tether 108 is elastic so as to provide a further degree of action for the object 106 when force is applied thereto. Alternatively, the tether 108 may be a non-elastic string or a linked or beaded chain that merely permits the object 106 to dangle from the distal end 112 of the support 104.

The mount 102 may be configured in any of numerous ways, and the invention is not limited to any particular type of mount. In the illustrative embodiment shown in the figures, for example, the mount 102 includes a pair of suction cups 202 and 204 which permit it to be attached to a vertically-oriented, smooth, clean surface. FIGS. 6A, 6B, 6C, and 6D show, respectively, perspective, side, front and top views of the mount 102 according to this example embodiment. In one embodiment, the entire mount 102 (except for the suctions cups 202 and 204) is made of acrylonitrile butadiene styrene (ABS). The suction cups may, for example, be made of polyvinyl chloride (PVC). Alternatively, the mount may, for example, be made of high impact polystyrene, and the suction cups may, for example, be made of medium density vinyl. In the embodiment shown in the figures, annular portions 602 and 604 of the suction cups 202 and 204 may be compressed and inserted into corresponding holes 608 and 610 in a planar portion 612 of the mount 102. After being so inserted, the annular portions 602 and 604 can expand radially so that the suction cups 202 and 204 are secured within the holes 608 and 610.

In alternative embodiments, the mount 102 may instead employ fasteners, e.g., screws, nails, rivets, bolts, hook and loop fasteners, or the like, to fasten the mount 102 to any surface. In some embodiments, the mount 102 may be configured such that it may be mounted to a horizontally-oriented surface such as a table top, or to a surface at a particular angle with respect to the ground. In yet other embodiments, the mount may be specially adapted to be mounted to a rounded surface such as a pole or the leg of a table or chair. For example, the mount 102 may have a rounded shape that can conform to such a rounded surface, and/or the mount 102 may include clamps (not shown) or the like which can secure the device about such a rounded structure.

As used herein, the term "external surface" refers any exposed surface of a structure (i.e., any outermost surface of a structure that is not resting on the floor or another structure) that has boundaries defined by sudden angular changes in the structure's contours. For example, according to this definition, a door has six external surfaces (i.e., a front and back, a top and bottom, and two sides), a round table leg has only one external surface (i.e., the outer surface of the cylindrical leg), a window pane has two external surfaces (i.e., a front and back), and each of the four walls in a room constitutes a separate, single external surface. The term "external surface" of a structure does not, as used herein, include the inner portions of a structure that may be contacted by fasteners which penetrate the structure's outermost surface to secure an object, e.g., the mount 102, to the structure. Therefore, in embodiments of the invention that employ such fasteners to secure the mount 102 to a structure, the inner portions of the structure contacted by the fasteners are not "external surfaces" of the structure, as that term is used herein.

In the embodiment shown in the figures, it should be noted that the mount 102 needs only to contact a single external surface of any structure, e.g., a door, wall, window, cabinet, table leg, or the like, and does not need to contact any additional external surfaces of such a structure, in order to be secured thereon. In alternative embodiments, the mount 102 can be configured to contact only two external surfaces of a structure. For example, the mount may be configured to be mounted to both the top and the side of a table top or desk, or may be configured to be mounted at the junction of two walls (i.e., a corner of a room) or the junction of a wall or the ceiling of a room. These embodiments can be contrasted to the prior art doormounted cat toys described above, which employ mounts that are required to contact three separate external surfaces (i.e., the front and back, as well as the top or bottom) of a door to secure the toys thereto. This feature of the present invention provides a significant advantage over such prior art devices in that a pet owner is permitted to secure the pet toy to virtually any location inside or outside a residence, and is not limited to locations where a door is located.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A pet toy, comprising:
   a mount;
   a support having first and second ends, the first end being pivotally connected to the mount so that the second end is permitted to pivot about the mount; and
   at least one object, which is intended to entice a pet, supported by the second end of the support;
   wherein the mount is adapted to be mounted to a vertically-oriented surface; and
   wherein the mount includes at least one suction cup adapted to adhere the mount to the vertically-oriented surface.

2. The pet toy of claim 1, further including a tether disposed between the second end of the support and the at least one object such that the at least one object dangles from the second end via the tether.

3. The pet toy of claim 1, wherein the support is elastic.

4. The pet toy of claim 2, wherein the tether is elastic.

5. The pet toy of claim 4, wherein the support is elastic.

6. The pet toy of claim 1, wherein the at least one suction cup includes a pair of suction cups.

7. The pet toy of claim 6, wherein the pair of suction cups are arranged on the mount such that one of the suction cups is oriented vertically above the other suction cup when the mount is adhered to the vertically-oriented surface.

8. The pet toy of claim 1, wherein the first end of the support is bent, and the mount includes a hole in which the bent portion of the first end of the support is disposed so that the bent portion of the first end of the support is permitted to pivot within the hole.

9. The pet toy of claim 1, wherein the second end of the support is adapted to releasably secure the at least one object thereto so that the at least one object can be selectively removed from the second end of the support.

10. The pet toy of claim 1, wherein the mount is adapted to contact as few as two external surfaces of a structure to which the mount is to be attached.

11. The pet toy of claim 10, wherein the mount is adapted to contact as few as one external surface of the structure.

12. The pet toy of claim 11, wherein the mount is adapted to contact only one external surface of the structure.

13. A pet toy, comprising:

a mount;

a support having first and second ends, the first end being pivotally connected to the mount so that the second end is permitted to pivot about the mount; and at least one object, which is intended to entice a pet, supported by the second end of the support;

wherein:

a first ring is provided at the second end of the support;

the object is attached to a second ring; and at least one of the first and second rings is configured such that the first and second rings can interlock.

14. The pet toy of claim 13, wherein the mount is adapted to contact as few as two external surfaces of a structure to which the mount is to be attached.

15. The pet toy of claim 14, wherein the mount is adapted to contact as few as one external surface of the structure.

16. The pet toy of claim 15, wherein the mount is adapted to contact only one external surface of the structure.

17. The pet toy of claim 13, further including a tether disposed between the second ring and the at least one object such that the at least one object dangles from the second ring via the tether.

18. The pet toy of claim 17, wherein the tether is elastic.

19. The pet toy of claim 13, wherein the mount is adapted to be mounted to a vertically-oriented external surface.

20. The pet toy of claim 19, wherein the mount includes at least one suction cup adapted to adhere the mount to the vertically-oriented surface.

21. The pet toy of claim 20, wherein the at least one suction cup includes a pair of suction cups.

22. The pet toy of claim 21, wherein the pair of suction cups is arranged on the mount such that one of the suction cups is oriented vertically above the other suction cup when the mount is adhered to the vertically-oriented surface.

23. The pet toy of claim 13, wherein the support is elastic.

24. The pet toy of claim 18, wherein the support is elastic.

25. The pet toy of claim 13, wherein the first end of the support is bent, and the mount includes a hole in which the bent portion of the first end of the support is disposed so that the bent portion of the first end of the support is permitted to pivot within the hole.

* * * * *